United States Patent
Miki et al.

(10) Patent No.: US 10,023,709 B2
(45) Date of Patent: Jul. 17, 2018

(54) MULTIPOROUS HOLLOW-FIBER MEMBRANE AND PROCESS FOR PRODUCING MULTIPOROUS HOLLOW-FIBER MEMBRANE

(71) Applicant: ASAHI KASEI CHEMICALS CORPORATION, Tokyo (JP)

(72) Inventors: Yuki Miki, Tokyo (JP); Daisuke Okamura, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 58 days.

(21) Appl. No.: 14/776,943

(22) PCT Filed: Mar. 18, 2014

(86) PCT No.: PCT/JP2014/057276
§ 371 (c)(1),
(2) Date: Sep. 15, 2015

(87) PCT Pub. No.: WO2014/148470
PCT Pub. Date: Sep. 25, 2014

(65) Prior Publication Data
US 2016/0039987 A1    Feb. 11, 2016

(30) Foreign Application Priority Data

Mar. 21, 2013    (JP) ................................. 2013-058333

(51) Int. Cl.
| | |
|---|---|
| C08J 9/00 | (2006.01) |
| B01D 69/08 | (2006.01) |
| B32B 3/26 | (2006.01) |
| B32B 5/02 | (2006.01) |
| B32B 5/00 | (2006.01) |
| B32B 5/16 | (2006.01) |
| B29C 67/20 | (2006.01) |
| B29K 27/00 | (2006.01) |
| B29K 105/04 | (2006.01) |
| B29L 31/00 | (2006.01) |

(52) U.S. Cl.
CPC ............ *C08J 9/0023* (2013.01); *B01D 69/08* (2013.01); *B32B 3/26* (2013.01); *B32B 5/00* (2013.01); *B32B 5/02* (2013.01); *B32B 5/022* (2013.01); *B32B 5/028* (2013.01); *B32B 5/16* (2013.01); *C08J 9/0066* (2013.01); *B29C 67/202* (2013.01); *B29K 2027/16* (2013.01); *B29K 2105/04* (2013.01); *B29L 2031/755* (2013.01); *B32B 2262/00* (2013.01); *B32B 2262/02* (2013.01); *B32B 2262/023* (2013.01); *B32B 2262/0215* (2013.01); *B32B 2264/00* (2013.01); *B32B 2264/10* (2013.01); *B32B 2264/102* (2013.01); *B32B 2307/54* (2013.01); *B32B 2307/724* (2013.01); *B32B 2307/726* (2013.01); *B32B 2410/00* (2013.01); *B32B 2432/00* (2013.01)

(58) Field of Classification Search
CPC . B32B 3/26; B32B 5/02; B29C 67/202; C08J 9/0023; C08J 9/0066
See application file for complete search history.

(56) References Cited

U.S. PATENT DOCUMENTS

| | | | |
|---|---|---|---|
| 4,401,567 A | 8/1983 | Shindo et al. | |
| 4,530,809 A | 7/1985 | Shindo et al. | |
| 2009/0297822 A1* | 12/2009 | Fujimura | B01D 69/085 428/314.2 |

FOREIGN PATENT DOCUMENTS

| | | |
|---|---|---|
| CN | 102219969 A | 10/2011 |
| JP | S57-066114 A | 4/1982 |
| JP | H3-042025 A | 2/1991 |
| JP | H4-180824 A | 6/1992 |
| JP | 2009-219979 A | 10/2009 |
| JP | 2012-040461 A | 3/2012 |
| WO | 2007/043553 A1 | 4/2007 |
| WO | 2010/029908 A1 | 3/2010 |

OTHER PUBLICATIONS

U U Guo-qiang et al., "Effect of Calcium Carbonate on Structure of Porous PVDF Membrane in TIPS Process", Polymer Materials Science and Engineering, vol. 23, No. 5, Sep. 30, 2007, pp. 234-237. (English abstract only.).
Chinese Office Action issued with respect to application No. 201480006957.5, dated May 11, 2016.
Plastic/Fonctional Polymer Material Encyclopedia Editorial Committee, "Plastic/Fonctional Polymer Material Encyclopedia", Industry Research Institute, Feb. 2004, pp. 672-679.
Hideto Matsuyama et al., "Making of Polymer System Porous Membrane Using Thermal Induced Phase Separation Method (TIPS method)", Chemical Engineering, Jun. 1998, pp. 45-56.
Akira Takizawa, "Membranes", IPC Ltd., Jan. 1992, pp. 404-406.
Douglas R. Lloyd et al., "Microporous membrane formation via thermally-induced phase separation. II. Liquid-liquid phase separation", Journal of Membrane Science, vol. 64, Nov. 15, 1991, pp. 1-11.

(Continued)

*Primary Examiner* — Peter D. Mulcahy
(74) *Attorney, Agent, or Firm* — Greenblum & Bernstein, P.L.C.

(57) ABSTRACT

The present invention relates to a multiporous hollow-fiber membrane containing a thermoplastic resin, in which an aspect ratio of outer surface pores is 10 or more, an aspect ratio of inner surface pores is 1 to 5, and a thickness of a polymer backbone forming the outer surface pores is 1 μm to 20 μm.

6 Claims, 2 Drawing Sheets

(56) References Cited

OTHER PUBLICATIONS

International Search Report issued with respect to application No. PCT/JP2014/057276, dated Apr. 28, 2014.
International Preliminary Report on Patentability issued with respect to application No. PCT/JP2014/057276, dated Oct. 1, 2015.

* cited by examiner

MULTIPOROUS HOLLOW-FIBER MEMBRANE AND PROCESS FOR PRODUCING MULTIPOROUS HOLLOW-FIBER MEMBRANE

TECHNICAL FIELD

The present invention relates to a multiporous hollow-fiber membrane and a process for producing a multiporous hollow-fiber membrane.

BACKGROUND ART

In recent years, as a method for clarifying river water to be used as tap water or the like, a filtration method using a multiporous hollow-fiber membrane that is advantageous in safety improvement of treated water and space-saving of facilities is now being widely employed. Three performances is required of a multiporous hollow-fiber membrane, that is, a high blocking performance capable of definitely removing bacterium such as *Cryptosporidium* and turbid components, a high permeability performance for treating a large amount of water, and high strength for enabling long-term use under a wide range of operation conditions including chemical cleaning and a high operating pressure.

If a multiporous hollow-fiber membrane is used in the field of treating water in particular, an external pressure filtration method capable of securing a large filtration area is principally employed. Therefore, a multiporous hollow-fiber membrane is required to have high strength against an external pressure direction, namely, high compression resistance strength, so that the hollow-fiber membrane cannot be crushed in a filtration operation.

Patent Literature 1 discloses a porous polyethylene hollow fiber and a process for producing the same by employing a stretching-opening method. On the other hand, a thermally induced phase separation method different from the stretching-opening method is known as a process for producing a multiporous membrane (see, for example, Non-patent Literatures 1 to 4).

CITATION LIST

Patent Literature

Patent Literature 1: JP 57-66114 A

Non-Patent Literature

Non-patent Literature 1: Plastic Kinosei Kobunshi Zairyo Jiten Editorial Committee, "Plastic Kinosei Kobunshi Zairyo Jiten (Dictionary of Plastics and Functional Polymeric Materials)" Industrial Research Center of Japan, February 2004, pp. 672-679

Non-patent Literature 2: Hideto Matsuyama, "Netsuyuki Sobunri-ho (TIP S-ho)niyoru Kobunshi-kei Takomaku no Sakusei (Production of Polymer-based Porous Membrane by Thermally Induced Phase Separation Method (TIPS Method)", Chemical Engineering, 1998 June issue, pp. 45-56, published by Kagaku Kogyo-sha Non-patent Literature 3: Akira Takizawa, "Maku (Membrane)", issued in January 1992, pp. 404-406, published by Industrial Publishing & Consulting Inc.

Non-patent Literature 4: D. R. Lloyd, et al., Journal of Membrane Science, 64 (1991) 1-11

SUMMARY OF INVENTION

Technical Problem

In a conventional process for producing a multiporous hollow-fiber membrane, however, it is difficult to produce a multiporous hollow-fiber membrane having both a high permeability performance and high compression resistance strength.

An object of the present invention is to provide a multiporous hollow-fiber membrane having dense pores suitable to filtration and a high permeability performance and excellent in strength, and a process for stably producing the multiporous hollow-fiber membrane.

Solution to Problem

The present inventors have made earnest studies to solve the aforementioned problem, resulting in accomplishing the present invention. Specifically, the present invention provides:

(1) A multiporous hollow-fiber membrane comprising a thermoplastic resin, in which an aspect ratio of outer surface pores is 10 or more, an aspect ratio of inner surface pores is 1 to 5, and a thickness of a polymer backbone forming the outer surface pores is 1 µm to 20 µm.

(2) The multiporous hollow-fiber membrane according to (1), in which pure water permeability is 9000 $L/m^2/hr$ or more, and compression resistance strength is 0.8 MPa or more.

(3) A multiporous multilayered hollow-fiber membrane, comprising one or more separation layers on an outer surface of the multiporous hollow-fiber membrane according to (1) or (2).

(4) A process for producing a multiporous hollow-fiber membrane, comprising: a step of molding a hollow-fiber-shaped melt-kneaded product by allowing a melt-kneaded product containing a thermoplastic resin, an organic liquid, and an inorganic fine powder having an average primary particle size of 18 nm to 100 nm to pass through a filter having a pore size of 30 µm to 500 µm and then to discharge from a nozzle plate having a ring-shaped discharge port; and a step of producing a multiporous hollow-fiber membrane by cool solidifying the hollow-fiber-shaped melt-kneaded product and removing, by extraction, the organic liquid and the inorganic fine powder.

(5) The process for producing a multiporous hollow-fiber membrane according to (4), in which the inorganic fine powder is silica.

Advantageous Effects of Invention

According to the present invention, a multiporous hollow-fiber membrane having dense pores suitable to filtration and a high permeability performance and excellent in strength, and a process for stably producing the multiporous hollow-fiber membrane can be provided.

DESCRIPTION OF EMBODIMENTS

Figure 1:
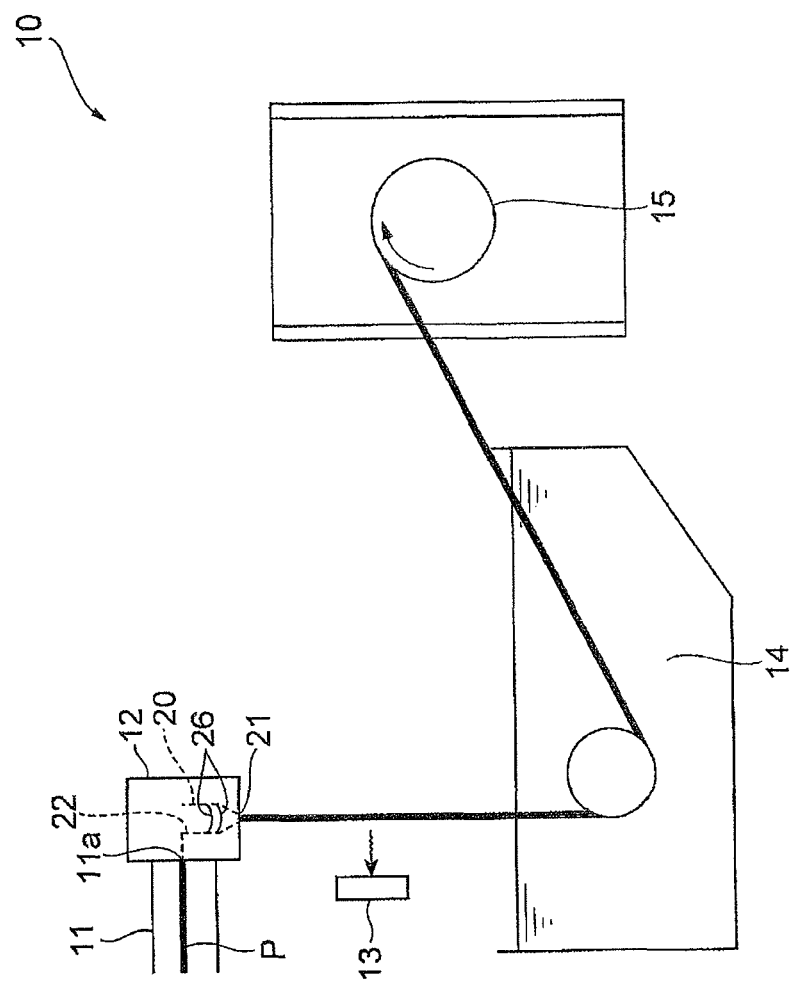
FIG. 1 is a diagram illustrating the structure of a production device used for producing a multiporous hollow-fiber membrane.

Now, a preferred embodiment of the present invention will be described in detail with reference to the accompanying drawings. It is noted that the same reference numerals are used to refer to the same elements or the same functions to avoid redundant description.

[Multiporous Hollow-Fiber Membrane]

A multiporous hollow-fiber membrane of the present embodiment contains a thermoplastic resin, in which an aspect ratio of outer surface pores is 10 or more, an aspect ratio of inner surface pores is 1 to 5, and a thickness of a polymer backbone forming the outer surface pores is 1 μm to 20 μm.

The thermoplastic resin is a resin that shows elasticity, and not plasticity, at normal temperature and becomes to show plasticity to be moldable when appropriately heated. Besides, the thermoplastic resin is a resin that returns to an original elastic material when cooled to have a lower temperature, and no chemical change in the molecular structure or the like is caused during the cooling (Encyclopedic Dictionary of Chemistry 6 reduced-size edition edited by Encyclopedic Dictionary of Chemistry Editorial Committee, Kyoritsu Shuppan Co., Ltd., pp. 860 and 867, 1963).

Examples of the thermoplastic resin include resins mentioned in the item of thermoplastic resins (pp. 829-882) in 12695 Chemical Products (The Chemical Daily, 1995), and resins mentioned on pp. 809-810 of Kagaku Binran Oyohen (Chemical Handbook Advanced) third revised edition (The Chemical Society of Japan, Maruzen Co., Ltd., 1980). Specific examples of the thermoplastic resin include: polyolefins such as polyethylene and polypropylene, polyvinylidene fluorides, an ethylene-vinyl alcohol copolymer, polyamide, polyether imide, polystyrene, polysulfone, polyvinyl alcohol, polyphenylene ether, polyphenylene sulfide, cellulose acetate, and polyacrylonitrile. In particular, crystalline thermoplastic resins such as polyethylene, polypropylene, polyvinylidene fluorides, an ethylene-vinyl alcohol copolymer and polyvinyl alcohol having crystallinity can be preferably used from the viewpoint of strength development. More preferably, polyolefins, polyvinylidene fluorides and the like can be used because they are so highly water resistant owing to their hydrophobicity that durability can be expected to be shown in general filtration of water-based liquid. Particularly preferably, polyvinylidene fluorides excellent in chemical durability such as chemical resistance can be used. Examples of the polyvinylidene fluorides include a vinylidene fluoride homopolymer and a vinylidene fluoride copolymer containing vinylidene fluoride in a ratio of 50 mol % or more. An example of the vinylidene fluoride copolymer includes a copolymer of vinylidene fluoride and one or more monomers selected from the group consisting of tetrafluoroethylene, hexafluoropropylene, trifluorochloroethylene and ethylene. A vinylidene fluoride homopolymer is particularly preferably used as the polyvinylidene fluoride.

From the viewpoint of a high permeability performance and compression resistance strength, in the multiporous hollow-fiber membrane, the aspect ratio of the outer surface pores is 10 or more, preferably 10 to 40, more preferably 10 to 38, and further preferably 11 to 36. In a conventional technique, if the pore size or the aperture ratio is increased in order to attain a high permeability performance of a hollow-fiber membrane, a polymer backbone is reduced in thickness, and hence, the compression resistance strength of the hollow-fiber membrane cannot be increased. On the contrary, as a result of examinations made by the present inventors, it has been found that the compression resistance strength can be increased by setting the aspect ratio of outer surface pores of a hollow-fiber membrane to 10 or more. When the aspect ratio of the pores is increased, the thickness of the polymer backbone in the longitudinal direction of the hollow-fiber membrane can be increased. Since the thickness of the polymer backbone in the longitudinal direction of the hollow-fiber membrane is regarded to largely affect the compression resistance strength of the hollow-fiber membrane, it is presumed that the compression resistance strength of the hollow-fiber membrane can be increased by increasing the thickness of the backbone.

The thickness of the polymer backbone of the outer surface pores is 1 μm to 20 μm. If the thickness of the backbone is 1 μm or more, the compression resistance strength can be increased. Besides, if the thickness of the backbone is 20 μm or less, deterioration of the permeability performance, otherwise caused by increasing the backbone and hence reducing the size of the pores, is difficult to occur. The thickness of the polymer backbone is preferably 1.5 μm to 18 μm, and more preferably 2 μm to 16 μm.

The aspect ratio of the outer surface pores corresponds to, as shown in the following expression, a value obtained by dividing a major axis of the outer surface pores by a minor axis of the outer surface pores.

Aspect ratio of outer surface pores=(major axis of outer surface pores)/(minor axis of outer surface pores)

The aspect ratio of the outer surface pores can be measured as follows. First, with a scanning electron microscope, a photograph of the outer surface of the hollow-fiber membrane is taken from a direction vertical to the outer surface at a magnifying power at which the shapes of pores as many as possible can be clearly observed. In the thus taken photograph, each pore formed on the outer surface is in a shape of a slender ellipse. Here, among lines each connecting two points on the outer circumference of the pore, the longest line is defined as the major axis, and among lines each connecting two points on the outer circumference of the pore and vertically crossing the major axis, the longest line is defined as the minor axis. From the pores formed on the outer surface, 100 pores are selected in descending order of the major axis. Incidentally, when an arbitrary line is drawn to cross the outer circumference of a pore, the pore is excluded from the measurement target if the outer circumference and the line cross at three or more points. Besides, when a pore formed on the outer surface is observed from the outer surface side toward the inner surface side, another pore may be formed in the bottom of the pore in some cases. Such a pore is all excluded from the measurement target. The major axis and the minor axis thus measured are used to obtain a value of (the major axis)/(the minor axis) of each of the selected 100 pores to calculate the aspect ratio of each pore. Thereafter, an arithmetic mean of the aspect ratios of the respective pores is calculated, and this value is used as the aspect ratio of the outer surface pores.

Besides, the image used for the measurement of the aspect ratio of the outer surface pores is used for measuring the thickness of the polymer backbone. With respect to a given pore, a distance, from the given pore along a vertical direction to the longitudinal direction of the hollow-fiber membrane, to another pore disposed at the shortest distance along the vertical direction is defined as the thickness of the polymer backbone. In most of the pores, the direction of the major axis accords with the longitudinal direction of the hollow-fiber membrane, but it may be slightly inclined against the longitudinal direction in some pores. In this case, a distance between the pores is defined as a shortest distance between points along the vertical direction to the longitudinal direction of the hollow-fiber membrane. Herein, 100 thicknesses of the polymer backbone are selected in ascending order, an arithmetic mean of the extracted 100 thicknesses is obtained, and this value is defined as the thickness of the polymer backbone of the outer surface pores.

The aspect ratio of the inner surface pores is 1 to 5. If the aspect ratio of the inner surface pores is 1 or more, a membrane having high breaking strength can be obtained. Besides, if the aspect ratio of the inner surface pores is 5 or less, a high permeability performance can be retained. The reason why the permeability performance is lowered when the aspect ratio of the inner surface pores is 5 or more is not clear but is presumed because a pressure loss is increased due to the change of the shape of the pore.

The aspect ratio of the inner surface pores corresponds to, as shown in the following expression, a value obtained by dividing a major axis of the inner surface pores by a minor axis of the inner surface pores. A measurement method for these is performed in the same manner as in the measurement of the outer surface pores.

Aspect ratio of inner surface pores=(major axis of inner surface pores)/(minor axis of inner surface pores)

The multiporous hollow-fiber membrane of the present embodiment having the outer surface pores, the inner surface pores and the thickness of the polymer backbone specified as described above can attain a high permeability performance of pure water permeability of 9000 L/m$^2$/hr or more and high strength of compression resistance strength of 0.8 MPa or more.

The upper limit of the pure water permeability of the multiporous hollow-fiber membrane is not especially specified, but is approximately 25000 L/m$^2$/hr. Besides, the upper limit of the compression resistance strength of the multiporous hollow-fiber membrane is not especially specified, but is approximately 2.0 MPa.

A multiporous multilayered hollow-fiber membrane obtained by providing one or more separation layers on the outer surface of the multiporous hollow-fiber membrane of the present embodiment can be further improved in the separation performance, and the permeability performance and the compression resistance strength as well as the separation performance can be attained at high level.

The multiporous hollow-fiber membrane of the present embodiment described above can be produced by the following process.

[Process for Producing Multiporous Hollow-Fiber Membrane]

The process for producing a multiporous hollow-fiber membrane of the preset embodiment comprises: a step of molding a hollow-fiber-shaped melt-kneaded product by allowing a melt-kneaded product containing a thermoplastic resin, an organic liquid, and an inorganic fine powder having an average primary particle size of 18 nm to 100 nm to pass through a filter having a pore size of 30 μm to 500 μm and then to discharge from a nozzle plate having a ring-shaped discharge port; and a step of producing a multiporous hollow-fiber membrane by cool solidifying the hollow-fiber-shaped melt-kneaded product and removing, by extraction, the organic liquid and the inorganic fine powder.

As the organic liquid, one that can be a latent solvent for the thermoplastic resin is used. The latent solvent herein means a solvent that does not almost dissolve the thermoplastic resin at room temperature (25° C.) but can dissolve it at a temperature higher than room temperature. It is noted that the organic liquid may be in the form of a liquid at a temperature of melting/kneading with the thermoplastic resin but is not necessarily in the form of a liquid at normal temperature.

If the thermoplastic resin is polyethylene, examples of the organic liquid include: phthalates such as dibutyl phthalate, diheptyl phthalate, dioctyl phthalate, di(2-ethylhexyl) phthalate, diisodecyi phthalate and ditridecyl phthalate; sebacates such as dibutyl sebacate; adipates such as dioctyl adipate; trimellitates such as trioctyl trimellitate; phosphates such as tributyl phosphate and trioctyl phosphate; glycerin esters such as propylene glycol dicaprylate and propylene glycol dioleate; paraffins such as liquid paraffin; and a mixture of any of these.

If the thermoplastic resin is polyvinylidene fluoride, examples of the organic liquid include: phthalates such as dimethyl phthalate, diethyl phthalate, dibutyl phthalate, dicyclohexyl phthalate, diheptyl phthalate, dioctyl phthalate, and di(2-ethylhexy) phthalate; benzoates such as methyl benzoate and ethyl benzoate; phosphates such as triphenyl phosphate, tributyl phosphate and tricresyl phosphate; ketones such as γ-butyrolactone, ethylene carbonate, propylene carbonate, cyclohexanone, acetophenone and isophorone; and a mixture of any of these.

If the average primary particle size of the inorganic fine powder is 18 nm or more, aggregates of the inorganic fine powder are oriented by the filter for passing in the melting/kneading, and pores of the hollow-fiber membrane are formed by using the oriented aggregates of the inorganic fine powder as nuclei. Besides, if the average primary particle size of the inorganic fine powder is 100 nm or less, deterioration of the permeability performance otherwise caused when the inner surface pores are oriented can be avoided. Therefore, the pores of the hollow-fiber membrane can be oriented, and a high permeability performance and high compression resistance strength can be both attained. The average primary particle size of the inorganic fine powder is preferably 20 nm to 80 nm, more preferably 20 nm to 60 nm, and further preferably 20 nm to 40 nm.

Examples of the inorganic fine powder include silica, alumina, titanium oxide, zirconium oxide and calcium carbonate. Among these, a hydrophobic silica fine powder difficult to aggregate and having good dispersibility is more preferably used, and hydrophobic silica having a MW (methanol wettability) value of 20% by volume or more is further preferably used. An MW value refers to a value in percentage by volume of methanol for completely wetting a powder. Specifically, the MW value is determined as follows: silica is put in pure water; methanol is gradually added below a liquid level with stirring; and a percentage by volume of the methanol in the resultant aqueous solution when 50% by mass of the silica settles is determined as the MW value.

As for the amount of the inorganic fine powder to be added, a mass ratio of the inorganic fine powder in the melt-kneaded product is preferably 5% by mass to 40% by mass, more preferably 10% by mass to 35% by mass, and further preferably 15% by mass to 30% by mass. If the ratio of the inorganic fine powder is 5% by mass or more, the effect of kneading with the inorganic fine powder can be sufficiently exhibited, and if it is 40% by mass or less, the hollow-fiber membrane can be stably spun.

As for a mixing ratio in the melting/kneading, in terms of a ratio of volumes obtained by dividing a mass by a specific gravity, the thermoplastic resin is preferably 15% by volume to 50% by volume, and a total volume ratio of the organic liquid and the inorganic fine powder is preferably 50% by volume to 85% by volume from the viewpoint of balance between the permeability performance and the strength of the resultant hollow fiber, or the stability of a spinning operation corresponding to melt extrusion operation. The thermoplastic resin is preferably 15% by volume or more from the viewpoint of the strength of the resultant multi-porous hollow-fiber membrane and the spinning stability, and is preferably 85% by volume or less from the viewpoint of the permeability performance of the multiporous hollow-fiber membrane and the spinning stability.

Next, the structure of a hollow-fiber membrane production device used for producing a multiporous hollow-fiber membrane will be described. FIG. 1 illustrates the structure of a hollow-fiber membrane production device 10 used for producing a multiporous hollow-fiber membrane. The hollow-fiber membrane production device 10 includes: a melt-kneader 11 for melt-kneading a thermoplastic resin, an organic liquid and an inorganic fine powder and extruding a melt-kneaded product P; a hollow fiber molding nozzle 12 provided on a tip (extruding) side of the melt-kneader 11; a suction device 13 for causing cooling air for the melt-kneaded product discharged from the hollow-fiber molding nozzle 12; a cooling tank 14 for solidifying the melt-kneaded product by cooling; and a winding roller 15 for winding a solidified hollow-fiber-shaped product. The melt-kneader 11 is usual melt-kneading means, and is, for example, a twin screw extruder.

In the hollow-fiber membrane production device 10, the melt-kneaded product P supplied from the melt-kneader 11 is discharged from the hollow-fiber molding nozzle 12 and transferred in air while being exposed to the cooling air caused by the suction device 13, and then, the melt-kneaded product is solidified by cooling bath in the cooling tank 14, followed by winding the thus solidified hollow-fiber-shaped product by the winding roller 15.

In the hollow-fiber molding nozzle 12, the melt-kneaded product P supplied from the melt-kneader 11 flows through a space provided inside the melt-kneader 11 and the hollow-fiber molding nozzle 12, and is discharged from a discharge port 21 of a nozzle plate 20 provided on the hollow-fiber molding nozzle 12. At the same time, a hollow portion forming fluid of, for example, air or a high boiling point liquid passes through a cylindrical through hole provided in the center of the hollow-fiber molding nozzle 12 and is discharged downward from a discharge port for the hollow portion forming fluid different from the discharge port 21.

Here, the nozzle plate 20 is a portion for molding and discharging the melt-kneaded product P having been melt-kneaded and extruded from the melt-kneader 11, and is a nozzle plate for molding a hollow fiber. The nozzle plate 20 includes an inlet 22 for receiving the melt-kneaded product P extruded from an extrusion port 11a of the melt-kneader 11, and the discharge port 21 for molding and discharging the melt-kneaded product. The discharge port 21 of the nozzle plate 20 is a double ring-shaped discharge port.

A multiporous multilayered hollow-fiber membrane can be produced by providing one or more separation layers on the outer surface of the multiporous hollow-fiber membrane of the present embodiment. The separation layer is a layer having a different pore size from the outer surface pores of the multiporous hollow-fiber membrane. The separation layer can be provided on the outer surface of the multiporous hollow-fiber membrane of the present embodiment by, for example, the following method.

In producing a multiporous multilayered hollow-fiber membrane, a hollow fiber molding nozzle having coaxially disposed two or more ring-shaped discharge ports is attached to the tip of an extruder, so that melt-kneaded products can be supplied to extrude from different extruders to the respective ring-shaped discharge ports. When the melt-kneaded products supplied from the different extruders are joined and overlapped by the discharge ports, a hollow-fiber-shaped extruded product having a multilayered structure can be obtained. At this point, when melt-kneaded products having different compositions are extruded from ring-shaped discharge ports adjacent to each other, a multilayered membrane having different pore size in layers adjacent to each other can be obtained.

Alternatively, after forming the multiporous hollow-fiber membrane of the present embodiment, a separation layer having a different composition can be coated on the outer surface of the multiporous hollow-fiber membrane to produce a multilayered membrane.

It is noted that the compositions different from each other refers to a case where the melt-kneaded products have different constituents, or have the same constituents in a different constituent ratio. Even when the same type of thermoplastic resin is used, melt-kneaded products are regarded to have different constituents, if the molecular weight or the molecular weight distribution is definitely different.

Besides, the hollow-fiber molding nozzle 12 is provided with a plurality of (two in the present embodiment) filters 26. The filters 26 are provided in the hollow-fiber molding nozzle 12 between the extrusion port of the melt-kneader 11 and the discharge port 21 of the nozzle plate 20, and their attaching position corresponds to a position where the melt-kneaded product P passes within 2000 seconds after being extruded from the extrusion port 11a of the melt-kneader 11. In other words, the melt-kneaded product P extruded from the extrusion port 11a of the melt-kneader 11 passes through the filters 26 within 2000 seconds. The filters 26 are preferably provided in the hollow-fiber molding nozzle 12 in two or more positions and five or less positions.

Since the melt-kneaded product is allowed to pass through the filters 26, a multiporous hollow-fiber membrane having a small number of independent pores and high continuity, namely, a high performance for an actual liquid, can be obtained, and in addition, a multiporous hollow-fiber membrane having high compressive strength can be obtained. In general, it is known to use a filter having a comparatively large aperture (slit width) for removing contaminations such as insoluble substances and burnt substances, but the filters 26 used in the present embodiment are used for a definitely different purpose.

When the melt-kneaded product passes through the filters 26, the aggregates of the inorganic fine powder present in the melt-kneaded product are oriented. It is regarded that the inorganic fine powder forms, in the melt-kneaded product, the aggregates with the organic liquid as a binder, and these aggregates correspond to portions principally forming the pores of the hollow-fiber membrane to be obtained. When the melt-kneaded product passes through the filters 26, the aggregates of the inorganic fine powder are oriented. Besides, the aggregates of the inorganic fine powder can be further oriented by exposing the melt-kneaded product to spinning draft after being discharged from the discharge port 21 of the hollow-fiber molding nozzle 12 and before entering the cooling tank 14, and the pores of the multiporous hollow-fiber membrane to be obtained can thus attain a further oriented structure.

Specifically, a process for producing a multiporous hollow-fiber membrane of the present embodiment may comprise: a step of molding a hollow-fiber-shaped melt-kneaded product by allowing a melt-kneaded product containing a thermoplastic resin, an organic liquid, and an inorganic fine powder having an average primary particle size of 18 nm to 100 nm to pass through a filter having a pore size of 30 μm to 500 μm and then to discharge from a nozzle plate having a ring-shaped discharge port while being exposed to spinning draft; and a step of producing a multiporous hollow-fiber membrane by cool solidifying the hollow-fiber-shaped melt-kneaded product and removing, by extraction, the organic liquid and the inorganic fine powder.

The magnitude of the draft is expressed by using a draft ratio, which is obtained as a ratio between a linear velocity in discharging the melt-kneaded product from the hollow-fiber molding nozzle 12 and a velocity of winding the solidified hollow-fiber-shaped product by the winding roller 15. The draft ratio can be changed by adjusting these velocities. The draft ratio is preferably 1.5 to 20, more preferably 1.6 to 18, and further preferably 1.7 to 15. If the draft ratio is 1.5 or more, the aggregates of the inorganic fine powder can be oriented. On the other hand, if the draft ratio exceeds 20, it is difficult to stably spin the hollow-fiber membrane, and hence, the draft ratio is preferably 20 or less. As a result, the thickness of the polymer backbone effective for the compression resistance strength of the multiporous hollow-fiber membrane can be attained as described above, and the compression resistance strength of the multiporous hollow-fiber membrane can be further increased.

The pore size of the filter is 30 μm to 500 μm, preferably 30 μm to 450 μm, and further preferably 30 μm to 390 μm. If it is 30 μm or more, the spinning can be stably performed without causing a discharge failure. Besides, if it is 500 μm or less, the structure having the pores oriented as described above can be attained, and hence, the compression resistance strength can be improved.

As the filters 26, any of commercially available sintered filters, stainless meshes obtained by weaving stainless wires, ceramic filters, and the like can be suitably used. A stainless mesh that can easily form a filter having high durability at a high temperature and having very narrow slits is preferably used. Besides, since a stainless wire having a small diameter is used if the slit width is small, for purpose of avoiding a risk of filter damage or the like, a filter having a large wire diameter and having a large slit width can be suitably provided on a rear surface of the former filter to be doubled.

The shape, the thickness and the like of each filter 26 are not especially limited and are appropriately selected. Specifically, it may be in the shape of a mesh, in the shape of a honeycomb usually employed in a ceramic filter, or in the shape of a narrow channel like an orifice. In particular, the shape of a mesh or a honeycomb having a plurality of slits is preferred from the viewpoint of dispersibility, and a mesh-shaped filter having a small pressure loss is most preferably used.

Figure 2:
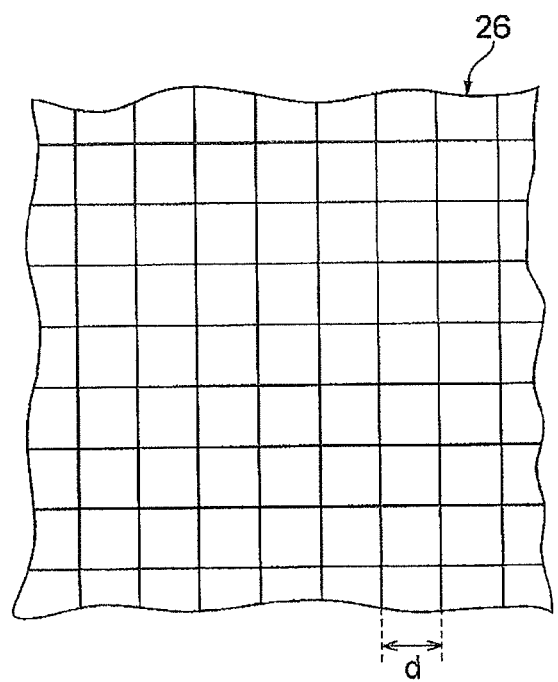
FIG. 2 is a diagram illustrating an example of a filter structure.

FIG. 2 is a diagram illustrating an example of the structure of the filter 26. FIG. 2 schematically illustrates the filter 26 in the shape of a mesh, having a prescribed slit width d. The slit width d corresponds to a filter pore size, is 30 μm to 500 μm, preferably 30 μm to 450 μm, and further preferably 30 μm to 390 μm.

Subsequently, the removal by extraction of the organic liquid and the removal by extraction of the inorganic fine powder will be described. The removal by extraction of the organic liquid and the removal by extraction of the inorganic fine powder can be simultaneously performed if they can be removed by extraction with the same solvent, but the removal by extraction of these is separately performed in general.

The removal by extraction of the organic liquid can be performed, with a liquid for extraction, that is, a liquid that mixes with the organic liquid without dissolving or denaturing the kneaded thermoplastic resin, by bringing the organic liquid into contact with the liquid for extraction by, for example, dipping. If the liquid for extraction is volatile, it can be conveniently easily removed from the hollow-fiber membrane after the extraction. Examples of the liquid for extraction include alcohols and methylene chlorides, and if the organic liquid is water-soluble, water can be also used as the liquid for extraction.

The removal by extraction of the inorganic fine powder can be performed as follows, if the inorganic fine powder is silica: first, the silica is brought into contact with an alkaline solution to convert it into silicate; and then the silicate is brought into contact with water to remove it by extraction.

There arises no problem no matter which of the removal by extraction of the organic liquid and the removal by extraction of the inorganic fine powder is performed first. In general, however, they (the organic liquid and the inorganic fine powder) are mixed and coexist in a phase where the organic liquid is densely contained, and therefore, if the organic liquid is immiscible with water, it is advantageous to perform the removal by extraction of the organic liquid first, and to perform the removal by extraction of the inorganic fine powder thereafter because the removal by extraction of the inorganic fine powder using a water-based liquid for extraction can be thus smoothly proceeded. In this manner, the multiporous hollow-fiber membrane can be obtained by removing, by extraction, the organic liquid and the inorganic fine powder from the hollow-fiber-shaped product solidified by cooling.

Incidentally, the hollow-fiber-shaped product resulting from the solidification by cooling can be drawn along the longitudinal direction of the hollow-fiber-shaped product at a draw ratio of 3 or less at any stage of (1) before the removal by extraction of the organic liquid and the inorganic fine powder, (2) after the removal by extraction of the organic liquid and before the removal by extraction of the inorganic fine powder, (3) after the removal by extraction of the inorganic fine powder and before the removal by extraction of the organic liquid, and (4) after the removal by extraction of the organic liquid and the inorganic fine powder. In general, if a multiporous hollow-fiber membrane is drawn in the longitudinal direction, the permeability performance is improved but the pressure resistance performance (the breaking strength and the compressive strength) is degraded, and therefore, the drawn membrane cannot attain practical strength in many cases. The multiporous hollow-fiber membrane 1 has, however, high mechanical strength because it is molded by discharging, from at least one ring-shaped discharge port 21, the melt-kneaded product in which the inorganic fine powder is also kneaded with the thermoplastic resin and the organic liquid. Therefore, the drawing at a draw ratio of 3 or less can be performed. Through this drawing, the permeability performance of the multiporous hollow-fiber membrane can be improved.

Incidentally, a draw ratio herein means a value obtained by dividing the length of a hollow fiber after the drawing by the length of the hollow fiber before the drawing. For example, if a hollow fiber with a length of 10 cm is drawn into a length of 20 cm, a draw ratio is 20 cm/10 cm=2. Besides, the drawn membrane may be subjected to a heat treatment if necessary to improve the pressure resistance strength. In general, the heat treatment is suitably performed at a temperature not higher than the melting point of the thermoplastic resin.

The aspect ratios of the outer surface pores and the inner surface pores of the multiporous hollow-fiber membrane can be controlled as follows:

(1) When the filter has a small pore size, the aggregates of the inorganic fine powder are oriented to increase the aspect ratio of the pores, and in addition, the linear velocity attained when the aggregates of the inorganic fine powder pass through the filter is increased, and as a result, the aggregates of the inorganic fine powder are more easily oriented. Besides, also when exposed to a draft, the aggregates of the inorganic fine powder can be easily oriented, and when the draft ratio is increased, they are more easily oriented.

(2) When the particle size of the inorganic fine powder is increased, the aggregates of the inorganic fine powder are easily oriented in passing through the filter. This is because if the primary particle size of the inorganic fine powder is increased, the size of the aggregates is also increased, and hence the aggregates of the inorganic fine powder are easily oriented in passing through the filter. As a result, the aspect ratio of the pores of the hollow-fiber membrane capable of extracting the inorganic fine powder is increased.

Besides, the aspect ratios of the outer surface pores and the inner surface pores of the multiporous hollow-fiber membrane can be controlled also by appropriately adjusting the inside diameter and the outside diameter of the hollow fiber molding nozzle 12.

EXAMPLES

The present embodiment will now be described in more details with reference to examples and comparative examples, and it is noted that the present embodiment is not limited to these examples. Measurement methods employed in the present embodiment are as follows. The following measurements are all performed at 25° C. unless otherwise mentioned. Evaluation methods will be described first before describing production methods and evaluation results of the examples and the comparative examples.

(1) Measurement of Outside Diameter and Inside Diameter (mm)

A hollow-fiber membrane was sliced with a razor or the like in the vertical direction to the longitudinal direction of the membrane, a longer diameter and a shorter diameter of an inside diameter and a longer diameter and a shorter diameter of an outside diameter in the cross section were measured with a microscope, and the inside diameter and the outside diameter were determined in accordance with the following expressions (2) and (3):

[Expression 1]

$$\text{Inside diameter [mm]} = \frac{\text{Inside longer diameter [mm]} + \text{Inside shorter diameter [mm]}}{2} \quad (2)$$

[Expression 2]

$$\text{Outside diameter [mm]} = \frac{\text{Outside longer diameter [mm]} + \text{Outside shorter diameter [mm]}}{2} \quad (3)$$

(2) Pure Water Permeability (L/m²/Hr)

A hollow-fiber membrane was wet by dipping it in a 50 mass % ethanol aqueous solution for 30 minutes, and then in water for 30 minutes. One end of the wet hollow-fiber membrane with a length of about 10 cm was sealed, an injection needle was inserted from the other end into a hollow portion, pure water at 25° C. was injected into the hollow portion from the injection needle at a pressure of 0.1 MPa, an amount of permeated pure water permeated to the outer surface was measured, and a pure water flux permeability was determined in accordance with the following expression. Here, an effective membrane length refers to a net membrane length excluding a portion where the injection needle is inserted.

[Expression 3]

$$\text{Pure water permeability[L/m}^2\text{/hr]} = \frac{60 \text{ [min/hr]} \times \text{Amount of permeated water [L]}}{\pi \times \text{Membrane inside diameter[m]} \times \text{Effective membrane length[m]} \times \text{Measurement time [min]}}$$

(3) Compressive Strength (MPa)

One end of a wet hollow-fiber membrane with a length of about 5 cm was sealed with the other end open to air, and the outer surface was compressed with pure water at 40° C. to allow permeated water to flow out through the air open end. At this point, a method in which the whole water supplied to the membrane is filtered without circulating, namely, a dead end filtration method, was employed. The compression pressure was increased from 0.1 MPa in increments of 0.01 MPa, and each pressure was retained for 15 seconds, so as to sample permeated water flowing out from the air open end during this 15 seconds. Before the hollow portion of the hollow-fiber membrane is crushed, the absolute value of the amount (mass) of permeated water is increased as the compression pressure is increased, but if the compression pressure exceeds the compression resistance strength of the hollow-fiber membrane, the hollow portion is crushed and starts to be blocked, and therefore, although the compression pressure is increased, the absolute value of the amount of permeated water is lowered. A compression pressure at which the absolute value of the amount of permeated water was the maximum was defined as the compression resistance strength.

(4) Breaking Strength (MPa) and Breaking Elongation (%)

The wet hollow-fiber membrane prepared in (2) Measurement of pure water permeability was used for measuring loads and displacements caused in stretching and breaking under the following conditions:

Measuring apparatus: Instron type tensile tester (manufactured by Shimadzu Corporation, trade name: AGS-5D)
Distance between chucks: 5 cm
Tensile speed: 20 cm/min
Measurement temperature: 25° C.

Next, the breaking strength and the breaking elongation were calculated in accordance with the following expression:

[Expression 4]

$$\text{Breaking strength [kgf/cm}^2\text{]} = \frac{\text{Load at break [kgf]}}{\text{Membrane cross-sectional area [cm}^2\text{]}}$$

$$\text{Breaking elongation[\%]} = \frac{\text{Displacement at break [cm]}}{5 \text{ [cm]}} \times 100$$

-continued

The above membrance cross-sectional area is obtained as follows:
Membrane cross-sectional area [cm$^2$] =

$$\pi \times \left\{ \left( \frac{\text{Membrane outside diameter[cm]}}{2} \right)^2 \right\} - \left\{ \left( \frac{\text{Membrane inside diameter[cm]}}{2} \right)^2 \right\}$$

[Raw Materials]
Raw materials used in the examples are as follows:
<Thermoplastic Resin>
Vinylidene fluoride homopolymer (manufactured by Kureha Corporation, trade name: KF#1000)
<Organic Liquid>
Bis(2-ethylhexyl) phthalate (CG Ester Corporation)
Dibutyl phthalate (CG Ester Corporation)
<Inorganic Fine Powder>
Silica fine powder (manufactured by Nippon Aerosil Co., Ltd.)

Example 1

Melt extrusion of a hollow-fiber membrane was performed by a melt kneader by using a vinylidene fluoride homopolymer as the thermoplastic resin, a mixture of bis (2-ethylhexyl) phthalate and dibutyl phthalate as the organic liquid, and a silica fine powder (manufactured by Nippon Aerosil Co., Ltd., trade name: Nax50, average primary particle size: approximately 30 nm) as the inorganic fine powder, and by using a nozzle plate having a double ring-shaped discharge port. A composition of the melt kneaded product of vinylidene fluoride homopolymer: bis (2-ethylhexyl) phthalate: dibutyl phthalate: silica fine powder was set to 40:30.8:6.2:23 (in a mass ratio), air was used as a hollow portion forming fluid, a hollow-fiber forming nozzle having an outside diameter of 2.00 mm and an inside diameter of 0.92 mm was used, and a hollow-fiber-shaped melt kneaded product was obtained at a resin temperature of 240° C. Here, the outside diameter of the nozzle corresponds to the outermost diameter of the discharge port, and the inside diameter of the nozzle corresponds to the maximum diameter of a partition wall provided between the discharge port for the melt kneaded product and a discharge port for the hollow portion forming fluid. The thus extruded hollow-fiber-shaped extruded product was transferred in air by a distance of 35 cm at a draft ratio of 2.8, and then, was introduced into a water bath at 40° C. to be solidified by cooling, and was wound around a reel at a speed of 35 m/min. As the filter, one 150 mesh (plain woven, slit width of 109 μm: manufactured by Taiyo Wire Cloth Co., Ltd.) backed up by one 40 mesh (plain woven, slit width of 390 μm: manufactured by Taiyo Wire Cloth Co., Ltd.) to overlap was used.

From the thus obtained hollow-fiber-shaped melt kneaded product, bis(2-ethylhexyl) phthalate and dibutyl phthalate were removed by extraction with methylene chloride, followed by drying. Thereafter, the resultant was dipped in a 40 mass % ethanol aqueous solution for 30 minutes, and then in water for 30 minutes. Subsequently, the resultant was dipped in a 5 mass % sodium hydroxide aqueous solution for 100 minutes and was repeatedly washed with water to remove the silica fine powder by extraction.

Example 2

A hollow-fiber membrane was obtained in the same manner as in Example 1 except that the inorganic fine powder was changed to one available from Nippon Aerosil Co., Ltd. under trade name: RX50 (average primary particle size: about 40 nm).

Example 3

A hollow-fiber membrane was obtained in the same manner as in Example 1 except that the inorganic fine powder was changed to one available from Nippon Aerosil Co., Ltd. under trade name: NX90G (average primary particle size: about 20 nm).

Example 4

A hollow-fiber membrane was obtained in the same manner as in Example 1 except that merely a 40 mesh (plain woven, slit width of 390 μm: manufactured by Taiyo Wire Cloth Co., Ltd.) was used as the filter.

Example 5

A hollow-fiber membrane was obtained in the same manner as in Example 1 except that one 400 mesh (plain woven, slit width of 34 μm: manufactured by Taiyo Wire Cloth Co., Ltd.) backed up by one 40 mesh (plain woven, slit width of 390 μm: manufactured by Taiyo Wire Cloth Co., Ltd.) to overlap was used as the filter.

Example 6

A hollow-fiber membrane was obtained in the same manner as in Example 1 except that the inorganic fine powder was changed to one available from Nippon Aerosil Co., Ltd. under trade name: NX90G (average primary particle size: about 20 nm) and that merely a 40 mesh (plain woven, slit width of 390 μm: manufactured by Taiyo Wire Cloth Co., Ltd.) was used as the filer.

Example 7

A hollow-fiber membrane was obtained in the same manner as in Example 1 except that the composition of the melt kneaded product of vinylidene fluoride homopolymer: bis(2-ethylhexyl) phthalate: dibutyl phthalate: silica fine powder was changed to 30:35.9:7.2:26.9 (in a mass ratio).

Example 8

A hollow-fiber membrane was obtained in the same manner as in Example 1 except that the composition of the melt kneaded product of vinylidene fluoride homopolymer: bis(2-ethylhexyl) phthalate: dibutyl phthalate: silica fine powder was changed to 45:28.2:5.6:21.2 (in a mass ratio).

Example 9

A hollow-fiber membrane was obtained in the same manner as in Example 1 except that the draft ratio was changed to 15.

Example 10

A hollow-fiber membrane was obtained in the same manner as in Example 1 except that the draft ratio was changed to 1.7.

Example 11

A hollow-fiber membrane was obtained in the same manner as in Example 1 except that the inorganic fine powder was changed to one available from Tosoh Silica Corporation under trade name: Nipsil E74P (average primary particle size: about 74 nm).

Comparative Example 1

A hollow-fiber membrane was obtained in the same manner as in Example 1 except that the inorganic fine powder was changed to one available from Nippon Aerosil Co., Ltd. under trade name: R972 (average primary particle size: about 16 nm). Since this hollow-fiber membrane could not attain a structure in which pores were oriented and the thickness of a polymer backbone was small, the compression resistance strength could not be increased.

Comparative Example 2

A hollow-fiber membrane was obtained in the same manner as in Example 1 except that merely a 30 mesh (plain woven, slit width of 560 μm: manufactured by Taiyo Wire Cloth Co., Ltd.) was used as the filter. Since this hollow-fiber membrane could not attain a structure in which pores were oriented and the thickness of a polymer backbone was small, the compression resistance strength could not be increased.

Comparative Example 3

A hollow-fiber membrane was obtained in the same manner as in Example 1 except that one 635 mesh (twill woven, slit width of 20 manufactured by Taiyo Wire Cloth Co., Ltd.) backed up by one 40 mesh (plain woven, slit width of 390 μm: manufactured by Taiyo Wire Cloth Co., Ltd.) to overlap was used as the filter. This hollow-fiber membrane attained a structure in which outer surface pores were oriented, and hence high compressive strength was obtained, but since the thickness of a polymer backbone was large, pure water permeability was low. Besides, since the slit width (pore size) of the used filter was small, a discharge failure occurred in a short period of time, and hence the spinning could not be continued.

Comparative Example 4

A hollow-fiber membrane was obtained in the same manner as in Example 1 except that one 500 mesh (twill woven, slit width of 26 μm: manufactured by Taiyo Wire Cloth Co., Ltd.) backed up by one 40 mesh (plain woven, slit width of 390 μm: manufactured by Taiyo Wire Cloth Co., Ltd.) to overlap was used as the filter. This hollow-fiber membrane attained a structure in which outer surface pores were oriented, and hence high compressive strength was obtained, but since inner surface pores were largely oriented, pure water permeability was low. Besides, since the slit width (pore size) of the used filter was small, a discharge failure occurred in a short period of time, and hence the spinning could not be continued.

The physical properties of the hollow-fiber membranes obtained in the examples and the comparative examples are shown in Table 1.

TABLE 1

| | Composition ratio of melt-kneaded product | | | | Primary | Filter | | Shape and physical properties of multiporous hollow-fiber membrane | |
|---|---|---|---|---|---|---|---|---|---|
| | Vinylidene fluoride homo-polymer (mass %) | Bis(2-ethyl-hexyl) phthalate (mass %)) | Dibutyl phthalate (mass %) | Fine powder silica (mass %) | particle size of inorganic fine powder (nm) | Filter pore size (μm) | Draft ratio | Membrane inside diameter (mm) | Membrane outside diameter (mm) |
| Example 1 | 40.0 | 30.8 | 6.2 | 23.0 | 30 | 109 | 2.8 | 0.66 | 1.22 |
| Example 2 | 40.0 | 30.8 | 6.2 | 23.0 | 40 | 109 | 2.8 | 0.66 | 1.22 |
| Example 3 | 40.0 | 30.8 | 6.2 | 23.0 | 20 | 109 | 2.8 | 0.66 | 1.22 |
| Example 4 | 40.0 | 30.8 | 6.2 | 23.0 | 30 | 390 | 2.8 | 0.66 | 1.22 |
| Example 5 | 40.0 | 30.8 | 6.2 | 23.0 | 30 | 34 | 2.8 | 0.66 | 1.22 |
| Example 6 | 40.0 | 30.8 | 6.2 | 23.0 | 20 | 390 | 2.8 | 0.66 | 1.22 |
| Example 7 | 30.0 | 35.9 | 7.2 | 26.9 | 30 | 109 | 2.8 | 0.66 | 1.22 |
| Example 8 | 45.0 | 28.2 | 5.6 | 21.2 | 30 | 109 | 2.8 | 0.66 | 1.22 |
| Example 9 | 40.0 | 30.8 | 6.2 | 23.0 | 30 | 109 | 15 | 0.66 | 1.22 |
| Example 10 | 40.0 | 30.8 | 6.2 | 23.0 | 30 | 109 | 1.7 | 0.66 | 1.22 |
| Example 11 | 40.0 | 30.8 | 6.2 | 23.1 | 74 | 109 | 2.8 | 0.66 | 1.22 |
| Comparative Example 1 | 40.0 | 30.8 | 6.2 | 23.0 | 16 | 109 | 2.8 | 0.66 | 1.22 |
| Comparative Example 2 | 40.0 | 30.8 | 6.2 | 23.0 | 30 | 560 | 2.8 | 0.66 | 1.22 |
| Comparative Example 3 | 40.0 | 30.8 | 6.2 | 23.0 | 30 | 20 | 2.8 | 0.66 | 1.22 |
| Comparative Example 4 | 40.0 | 30.8 | 6.2 | 23.0 | 30 | 26 | 2.8 | 0.66 | 1.22 |

| | Shape and physical properties of multiporous hollow-fiber membrane | | | | | | |
|---|---|---|---|---|---|---|---|
| | Aspect ratio of outer surface pores (—) | Aspect ratio of inner surface pores (—) | Pure water permeability (L/m²/hr @0.1 MPa) | Composition resistance strength (MPa) | Breaking strength (MPa) | Breaking elongation (%) | Thickness of polymer backbone (μm) |
| Example 1 | 16 | 3.4 | 10000 | 0.90 | 11.0 | 130 | 5.4 |
| Example 2 | 36 | 4.3 | 13500 | 0.90 | 12.0 | 130 | 13.9 |
| Example 3 | 12 | 3.6 | 9500 | 0.85 | 11.5 | 110 | 2.8 |
| Example 4 | 13 | 2.2 | 9800 | 0.85 | 10.5 | 135 | 3.1 |

TABLE 1-continued

| | | | | | | | |
|---|---|---|---|---|---|---|---|
| Example 5 | 23 | 5 | 12000 | 0.95 | 10.5 | 120 | 15.9 |
| Example 6 | 11 | 3.8 | 9000 | 0.80 | 10.5 | 120 | 2.0 |
| Example 7 | 15 | 3.7 | 11500 | 0.90 | 10.5 | 125 | 4.3 |
| Example 8 | 18 | 4.1 | 9700 | 0.90 | 11.5 | 135 | 7.8 |
| Example 9 | 38 | 4.2 | 14000 | 0.95 | 12.0 | 125 | 14.3 |
| Example 10 | 10 | 1.2 | 9100 | 0.85 | 11.0 | 115 | 3.3 |
| Example 11 | 40 | 3.2 | 15300 | 0.95 | 12.0 | 125 | 18.3 |
| Comparative Example 1 | 1.5 | 0.7 | 9800 | 0.60 | 6.5 | 120 | 0.6 |
| Comparative Example 2 | 6 | 0.9 | 8600 | 0.70 | 6.0 | 120 | 0.7 |
| Comparative Example 3 | 41 | 4.9 | 6600 | 0.90 | 13.0 | 110 | 22.3 |
| Comparative Example 4 | 36 | 5.4 | 6900 | 0.85 | 12.5 | 125 | 16.0 |

REFERENCE SIGNS LIST

10: hollow-fiber membrane production device, 11: melt kneader, 11a: extrusion port, 12: hollow-fiber-molding nozzle, 13: suction device, 14: cooling tank, 15: winding roller, 20: nozzle plate, 21: discharge port, 22: inlet, 26: filter, d: slit width, P: melt kneaded product

The invention claimed is:

1. A multiporous hollow-fiber membrane, comprising a thermoplastic resin, wherein an aspect ratio of outer surface pores is 10 or more, an aspect ratio of inner surface pores is 1 to 5, and a thickness of a polymer backbone forming the outer surface pores is 1 µm to 20 µm.

2. The multiporous hollow-fiber membrane according to claim 1, wherein pure water permeability is 9000 L/m²/hr or more and compression resistance strength is 0.8 MPa or more.

3. A multiporous multilayered hollow-fiber membrane comprising one or more separation layers formed on an outer surface of the multiporous hollow-fiber membrane according to claim 1.

4. A process for producing a multiporous hollow-fiber membrane, comprising:
   molding a hollow-fiber-shaped melt-kneaded product by allowing a melt-kneaded product containing a thermoplastic resin, an organic liquid, and an inorganic fine powder having an average primary particle size of 20 nm to 100 nm to pass through a filter having a pore size of 30 µm to 500 µm and then to discharge from a nozzle plate having a ring-shaped discharge port; and
   producing a multiporous hollow-fiber membrane by cool solidifying the hollow-fiber-shaped melt-kneaded product and removing, by extraction, the organic liquid and the inorganic fine powder.

5. The process for producing a multiporous hollow-fiber membrane according to claim 4, wherein the inorganic fine powder is silica.

6. A multiporous multilayered hollow-fiber membrane comprising one or more separation layers formed on an outer surface of the multiporous hollow-fiber membrane according to claim 2.

* * * * *